July 27, 1954
F. B. SMITH
PERMANENT MAGNET STRUCTURE FOR
ELECTRODYNAMIC LOUD-SPEAKERS
Original Filed Dec. 2, 1948
Re. 23,856
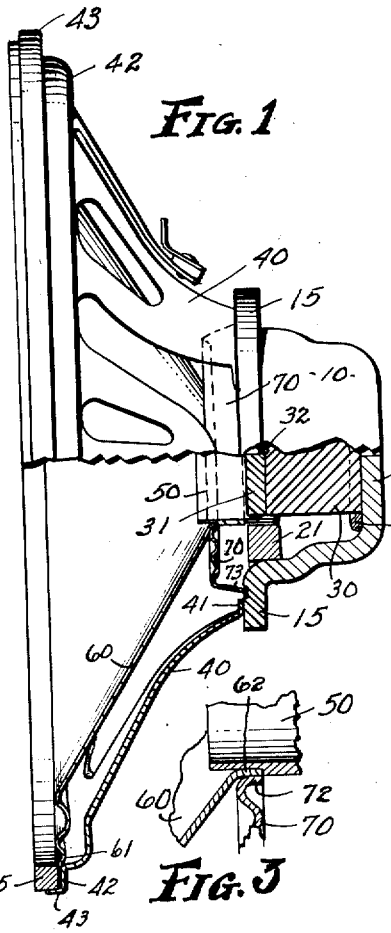
FIG. 1
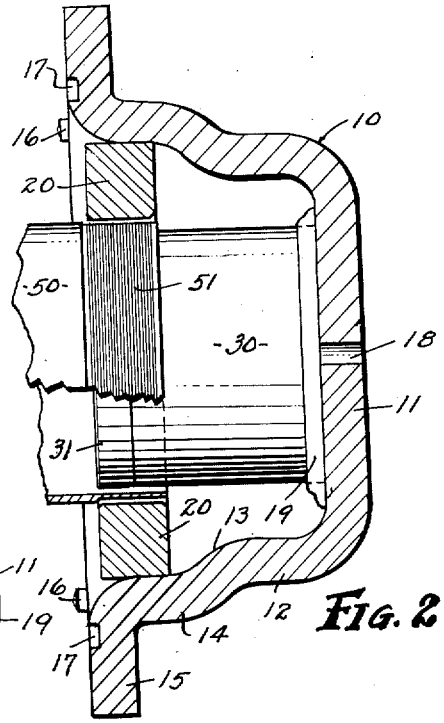
FIG. 2
FIG. 3
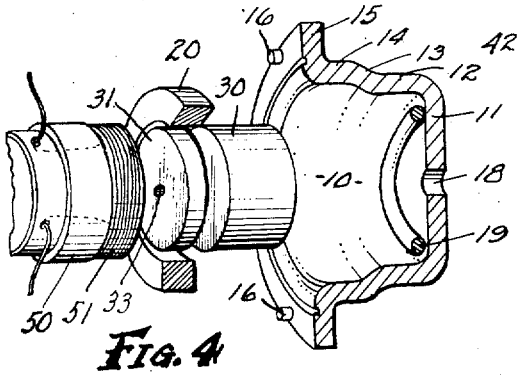
FIG. 4
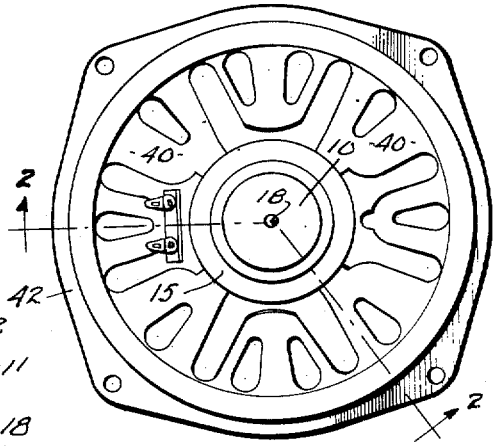
FIG. 5
INVENTOR.
BY FRANCIS B SMITH
Bates, Teare, & McBean
ATTORNEYS Reissued July 27, 1954 Re. 23,856

UNITED STATES PATENT OFFICE 23,856

PERMANENT MAGNET STRUCTURE FOR ELECTRODYNAMIC LOUD-SPEAKERS

Francis B. Smith, Lakewood, Ohio, assignor to The Rola Company, Inc., Cleveland, Ohio, a corporation of Ohio Original No. 2,517,727, dated August 8, 1950, Serial No. 63,015, December 2, 1948. Application for reissue July 27, 1951, Serial No. 238,790

7 Claims. (Cl. 179—115.5)

Matter enclosed in heavy brackets [ ] appears in the original patent but forms no part of this reissue specification; matter printed in italics indicates additions made by reissue.

This invention relates to a loud speaker of the permanent magnet type employing a hollow shell of magnetic material carrying an annular pole ring and a permanent magnet extending within the ring and spaced from it leaving an annular space occupied by the voice coil. The object of the invention is to obtain a maximum and uniform distribution of flux between the permanent magnet and the pole ring.

A further object is to provide a rugged construction of magnetic assembly which will withstand severe shocks without affecting the performance of the speaker. My magnetic assembly is also adapted for embodiment in the very simple and compact construction which will have a minimum of overall depth and still give the requisite performance.

A still further object of the invention is to provide a complete magnetic assembly which with the cone housing can be assembled independently of the diaphragm, voice coil form and centering member, which latter parts may be attached as a unit to the cone housing.

I have found that I can materially increase the uniformity of the flux from the pole ring to the magnet by facing the magnet proper with a pole tip of different material, preferably a disc of soft steel at the end of the magnet, such disc and the end portion of the magnet proper both occupying the space within the pole ring carried by the shell. The space occupied by the magnet and its tip is no greater than that formerly occupied by the magnet alone.

I have also found that a certain relation exists between the thickness of the pole ring and that of the magnet tip, and my invention includes such relative proportioning of these members as will give the best results, as hereinafter explained in detail.

My invention is illustrated in the drawing hereof and is hereinafter fully explained and the essential novel features are summarized in the claims.

In the drawing, Fig. 1 is a side elevation partly in section of the complete loud speaker; Fig. 2 is an enlarged view in axial section of the magnetic assembly, shown associated with a portion of the voice coil form, which is partly broken away; Fig. 3 is a fragmentary view in section showing the connection of the voice coil form to the conical diaphragm and the centering member; Fig. 4 is a separated perspective of the parts of the magnetic assembly and the voice coil; Fig. 5 is a rear view of the complete loud speaker.

In Figs. 1, 2 and 4, I have shown at 10 a shell of magnetizable material and of pot-like formation having a flat base 11, an annular wall 12 kinking outwardly at 13 into a larger substantially cylindrical portion 14 which terminates in a flat annular flange 15 parallel with the base 11. The annular flange 15 is provided with means for securing the diaphragm housing, the means shown being pins 16 projecting from the flange which may be peened over onto the housing. The flange is also formed with a circular groove 17 concentric of the pot axis which serves to position the centering member as hereinafter explained. The drawings indicate a central hole 18 in the base 11 which may be used if desired to receive a positioning pin when the loud speaker is mounted.

Mounted within the larger cylindrical portion 14 of the frame 10 is the pole ring 20 which is preferably pressed into position and thereafter retains itself permanently in place.

Mounted centrally within the pot 10 is the permanent magnet 30. This magnet is a cylindrical member resting against the base 11 and secured thereto by a surrounding soldering ring 19.

On the inner face of the magnet 30 I mount the tip or face plate 31 which is of material different from the magnet 30. It is preferably a soft steel of the same composition as the pole ring 20. The tip has the same diameter as the magnet and is secured thereto by suitable means as a small quantity of solder 32 passed through a central opening 33 in the tip. This makes a very rigid and compact magnetic unit. The tip lies flat against the face of the magnet, the apparent space between them, especially in Fig. 2, being for clearness of illustration.

As heretofore mentioned, and as hereinafter more fully explained, there is a certain definite relation which should be observed between the thickness of the pole tip and that of the pole ring. The drawing shows the pole tip as substantially half that of the pole ring, which is within the desirable proportion.

In Figs. 1 and 5, I have shown a housing 40 of conical formation with frequent openings and having its inner end flanged inwardly to provide feet 41 resting against the pot-flange 15, as by the insertion and peening over of the pins 16. At the outer end of the housing it is provided with a flat annular flange 42 at the outer periphery of which is a cylindrical flange 43. This provides a rabbet to receive the outwardly flanged edge of the cone diaphragm and the pad ring 45.

The voice coil form indicated at 50 is a cylindrical member of suitable non-magnetic material, as paper or fibre, and carries the usual coil 51 on its exterior. The diaphragm is a conical member 60 of suitable material, as for instance paper, having a corrugated flange 61 at its larger periphery which is adapted to rest in the rabbet of the housing. At the inner periphery the diaphragm has a cylindrical flange 62 which snugly surrounds the voice coil form.

The centering member 70 is a corrugated annular member of flexible non-magnetic material. At its inner end it has a cylindrical flange 72 which rests snugly within the diaphragm flange 62. At its outer end the centering member has a portion of frusto-conical formation 73 which terminates in a slight outer flange. This small flange seats within the annular groove 17 of the magnetic unit.

The diaphragm, the voice-coil-form with its coil and the centering member are all assembled as a unit, independently of the magnetic structure and housing. In mounting this vibratory unit, the end of the centering member enters the groove in the flange of the magnetic unit and is cemented therein, while the outer edge of the diaphragm is cemented in place in the rabbet of the housing and is covered by the usual yielding pad ring. It will be seen that this method of mounting accurately positions the vibratory unit with reference to the magnetic unit, and holds the voice coil yieldingly in proper position within the pole ring and surrounding both the magnet tip and an adjacent portion of the magnet.

I have hereinbefore mentioned that an operative relation exists between the thickness of the pole tip and that of the annular pole ring surrounding the tip. The pole ring should be of greater thickness than the tip, so that it will directly surround both the tip and a portion of the magnet proper. Exhaustive experiments which I have conducted have demonstrated that to obtain the maximum flux density in the air gap, the tip should not be less than half the thickness of the pole ring and should not be greater than three-fourths such thickness. Between these limits there results not only the maximum flux density but also a substantially uniform distribution of the flux across the gap.

I also find it desirable to make the pole tip of substantially the same material as the pole ring. I have produced very satisfactory results by making the magnet proper of an alloy known as Alnico-V and using for both the tip and the ring a steel of the specification S. A. E. B 1112. It is important in any event that the magnet proper be of such material as will retain its permanent magnetism substantially undiminished by time, while the magnet tip and the pole ring should be of material adapted to be magnetized but not of itself permanently magnetic.

One of the characteristics of Alnico-V is that it has a preferred axis of magnetization, i. e. it is anisotropic, and as used in this invention, the axis of magnetization is in the same general direction as the axis of the magnet 30. The pole tip 31 has isotropic characteristics and in practice I have found that satisfactory results have been obtained when the permeability of the tip lies between 1,200 and 1,400 at the operating flux density for which the structure is designed.

I claim:

1. A permanent magnet structure for a loud speaker comprising a permanent magnet, a support therefor, a tip of magnetizable material but which is not a magnet, attached to the end of said magnet, a pole plate of magnetizable material carried by the support and enclosing at least portions of the magnet and pole tip, said pole tip having a thickness not less than half of that of the plate and not more than three quarters of that of the plate, said permanent magnet having anisotropic characteristics and said pole tip having isotropic characteristics, whereby the ratio of total useful flux to the volume of anisotropic material is substantially a maximum.

2. A permanent magnet structure for a loud speaker comprising a cylindrical permanent magnet, a support therefor, and attached to one end thereof, a circular pole tip of magnetizable material and of substantially the same diameter as the permanent magnet and secured coaxially to the end of the magnet opposite the connection to said support, and a pole plate of magnetizable material carried by the support and having an aperture therein concentrically of the magnet and pole tip and spaced therefrom, said tip having an axial dimension less than that of the plate, whereby the plate surrounds both pole tip and the adjacent portion of the permanent magnet, said permanent magnet having anisotropic characteristics and said pole tip having isotropic characteristics, whereby the ratio of total useful flux to the volume of anisotropic material is substantially a maximum.

3. A permanent magnet structure for a loud speaker comprising a permanent magnet, a support attached to one end of the magnet and having portions thereof extending axially of the magnet and terminating in the region adjacent the opposite end of the magnet, a pole plate attached to said portion and having an aperture therein, a pole tip attached to the end of the magnet and being disposed in said aperture, said pole tip having a thickness less than that of the pole plate and having its outer face substantially in the outer plane of the face of the pole plate, said permanent magnet having anisotropic characteristics and said pole tip having isotropic characteristics, whereby the ratio of total useful flux to the volume of anisotropic material is substantially a maximum.

4. *A magnetic circuit for a transducer comprising, in combination, a pole plate of magnetically soft iron having relatively flat front and back face surfaces and a voice coil aperture with an internal cylindrical pole surface therein terminating in parallel annular front and back pole plate edges at said face surfaces; a magnetically soft iron pole piece comprising a circular disc having flat parallel front and back face surfaces and an external cylindrical pole surface terminating in parallel annular edges at said face surface; said pole piece being concentric with the voice coil aperture and wholly within the voice coil aperture; a return yoke of magnetically soft iron including a back plate parallel with and spaced from said pole plate, and a magnetic generator comprising a cylindrical permanent magnet of diameter less than the diameter of the voice coil aperture; said magnet extending from the back plate of the return yoke and abutting the back face surface of the pole piece.*

5. *A magnetic circuit for a transducer comprising, in combination, a pole plate of magnetically soft iron having relatively flat front and back face surfaces and a voice coil aperture with an internal cylindrical pole surface therein terminating in parallel annular front and back pole plate edges at said face surfaces; a magnetically*

*soft iron pole piece comprising a circular disc having flat parallel front and back face surfaces and an external cylindrical pole surface terminating in parallel annular edges at said face surfaces; said pole piece being concentric with the voice coil aperture and positioned wholly within the voice coil aperture; a return yoke of magnetically soft iron including a back plate parallel with and spaced from said pole plate, and a magnetic generator comprising a permanent magnet of aluminum-nickel-cobalt-iron alloy; said magnet having parallel flat rear and forward pole faces, with the rear pole face abutting the back plate of the return yoke and the forward pole face abutting the back face surface of the pole piece.*

*6. A magnetic circuit for a transducer comprising, in combination, a pole plate of magnetically soft iron having relatively flat front and back face surfaces and a voice coil aperture with an internal cylindrical pole surface therein terminating in parallel annular front and back pole plate edges at said face surfaces; a magnetically soft iron pole piece comprising a circular disc having flat parallel front and back face surfaces and an external cylindrical pole surface terminating in parallel annular edges at said face surfaces; said pole piece being concentric with the voice coil aperture and positioned within the voice coil aperture with the rear face surface of the pole piece spaced forwardly from the rear face of said pole plate; a return yoke of magnetically soft iron including a back plate parallel with and spaced from said pole plate, and a magnetic generator comprising a cylindrical permanent aluminum-nickel-cobalt-iron alloy magnet of diameter less than the diameter of the voice coil aperture; said magnet having parallel flat rear and forward pole faces, with the rear pole face abutting the back plate of the return yoke and the forward pole face extending beyond the rear face of the pole plate, into the aperture, and abutting the back face surface of the pole piece.*

*7. A magnetic circuit for a transducer comprising, in combination, a pole plate of magnetically soft iron having relatively flat front and back face surfaces, and a voice coil aperture with an internal cylindrical pole surface therein terminating in parallel annular front and back pole plate edges at said surfaces; a magnetically soft iron pole piece comprising a circular disc having an external cylindrical pole surface terminating in parallel annular edges at said face surfaces, said pole piece being concentric with the voice coil aperture and positioned in the voice coil aperture; a return yoke of magnetically soft iron including a back plate parallel with and spaced from said pole plate, and a magnetic generator comprising a permanent magnet of aluminum-nickel-cobalt-iron alloy, said magnet having parallel flat rear and forward pole faces, with the rear pole face abutting the back plate of the return yoke, and the forward pole face extending substantially to the rear face of the pole plate and abutting the back face surface of the pole piece.*

References Cited in the file of this patent or the original patent

UNITED STATES PATENTS

| Number | Name | Date |
|---|---|---|
| 1,918,164 | Woolf et al. | July 11, 1933 |
| 1,955,248 | Messick | Apr. 17, 1934 |
| 2,029,282 | Serge | Jan. 28, 1936 |
| 2,458,158 | Gilman | Jan. 4, 1949 |

FOREIGN PATENTS

| Number | Country | Date |
|---|---|---|
| 297,183 | Great Britain | Sept. 20, 1928 |